Purdy & Barger.
Boiler.
No. 67,452.　　　　　　　　　　Patented Aug. 6, 1867.
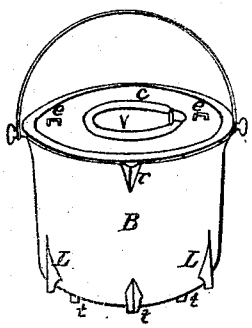
Fig: 3.
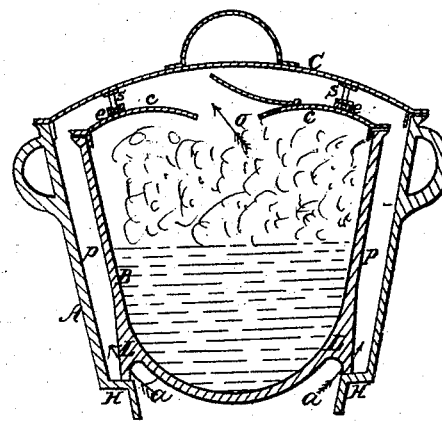
Fig: 1.
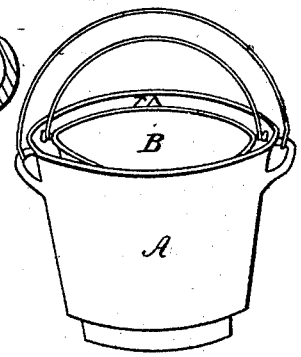
Fig: 2.
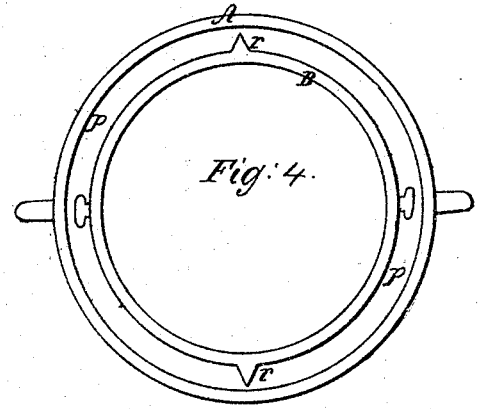
Fig: 4.
Witnesses;　　　　　　　　　　Inventors;
　　　　　　　　　　　　　　　　Joshua R. Purdy
　　　　　　　　　　　　　　　　D. C. Barger

United States Patent Office.

JOSHUA R. PURDY AND D. C. BARGER, OF PEEKSKILL, NEW YORK.

Letters Patent No. 67,452, dated August 6, 1867.

---

IMPROVEMENT IN BOILERS.

---

The Schedule referred to in these Letters Patent and making part of the same.

---

TO ALL WHOM IT MAY CONCERN:

Be it known that we, J. R. PURDY and D. C. BARGER, of Peekskill, in the county of Westchester, in the State of New York, have invented certain new and useful improvements in Pots or Kettles for culinary purposes; and we do hereby declare the following to be a full, clear, and exact description of the same, reference being had to the accompanying drawings, making a part of this specification, in which—

Figure 1 is a vertical section through the middle.

Figure 2, a side view with the covers off.

Figure 3, a view of the inner pot with the cover on; and

Figure 4, a top view with both covers off.

This invention consists in constructing a double pot or kettle for culinary purposes in such a manner that when placed upon the opening in the top of the stove or range the heat passes entirely around and over the top of the inner pot which contains the material to be cooked, thereby accelerating the process of cooking, and requiring a much smaller amount of fuel than the ordinary pot. Also, in providing a double cover whereby all the gas, smoke, and cinders are excluded from the interior of the pot containing the material to be cooked, while at the same time allowing the escape of the steam and odor from the same through the flues and chimney.

The outer pot A and inner pot B are constructed in the usual form, the inner pot being enough smaller to leave a space, $p\ p$, between it and the outer pot, and having the legs L L and projections $r\ r$ to keep them apart and allow a free circulation of heat around the sides of the inner pot. The projections may be upon the inside of the outer pot if desired. The inner pot B is provided with a closely-fitting cover or lid, $c$, having in the centre thereof a valve, V, covering the opening O, and provided with eyes $e\ e$. The outer pot A is also provided with a closely-fitting cover, C, to which are attached standards or hooks $s\ s$. Upon placing this outer cover upon the pot A and turning it partly around, these hooks fit into the eyes $e\ e$, so that both covers may be removed at once. When placed upon the stove or range, the whole of the outer surface of the pot B is exposed to the heat, which passes up in the direction of the arrows $a\ a$, and completely surrounds the sides, and passes freely between the lids C and $c$. While the process of cooking is going on, the valve V remains closed until the steam accumulates sufficiently to force it open, when the steam and odor pass out, and instead of escaping into the room are drawn into the flue of the stove and pass out at the chimney. The inner pot B, as shown in fig. 3, has three legs, L L L, which rest upon the shoulder H H of the outer pot when placed over the fire. There are also three legs $t\ t\ t$, upon which it rests when taken out of the larger pot.

Having thus described our improvements, what we claim as our invention, and desire to secure by Letters Patent, is—

1. The arrangement and combination of the outer pot A and inner pot B, with legs L L, and projections $r\ r$, substantially as set forth.

2. The double cover C $c$, attached together by the hooks or standards $s\ s$ and eyes $e$-$e$, or some equivalent device.

3. The valve V, placed in the cover of the inner pot B, for the purpose of allowing the escape of steam and odor.

4. The arrangement and combination of the pots A and B, covers C and $c$, substantially as and for the purposes set forth.

JOSHUA R. PURDY,
D. C. BARGER.

Witnesses:
STEPHEN LENT,
H. W. SMITH.